Nov. 9, 1943.      C. J. WERNER      2,333,906
CONTROL DEVICE FOR ELECTRIC MOTORS
Filed Nov. 12, 1941

INVENTOR
CALVIN J. WERNER
HIS ATTORNEYS.

Patented Nov. 9, 1943

2,333,906

UNITED STATES PATENT OFFICE 2,333,906

CONTROL DEVICE FOR ELECTRIC MOTORS

Calvin J. Werner, Dayton, Ohio, assignor to General Motors Corporation, Detroit, Mich., a corporation of Delaware Application November 12, 1941, Serial No. 418,743

6 Claims. (Cl. 172—279)

This invention relates to improvements in controls for electric motors.

The device of the present invention is an improvement over the control devices disclosed in my Patent No. 2,095,579 of October 12, 1937. This patented device comprises a switch provided with counteracting spring and thermal elements adapted to control both the starting and running windings of the electric motor in accordance with motor conditions.

Normally this device closes both winding circuits inasmuch as the thermal element normally overcomes the effect of the spring to actuate the device to circuit open position. At starting a heavy surge of current traverses the thermal element, which heats up and expands predeterminately as a result of the said heavy surge of current flow through it for a predetermined length of time, thereby permitting the spring to actuate the device to break the starting winding circuit. The motor now operates with its running winding circuit complete. As long as the current of a normally running motor traverses the thermal element it will not be heated sufficiently to cause it to expand and permit the spring to open the running winding circuit. However, if the motor is stalled or subjected to an overload, the consequent excessive flow of current through the running winding circuit and the thermal element will cause a further heating up and thus an additional expansion of said element which again permits the spring to become effective to actuate the device, this time breaking the running winding circuit of the motor.

From this it may be seen that the patented device provides starting control and overload protection to the motor.

As mentioned above, the thermal element of the patented device is so designed that a predetermined heavy surge of current must traverse said thermal element a predetermined time before it will heat up and expand sufficiently to permit the spring to effect opening of the motor starting circuit. This predetermined time is of sufficient duration to permit the motor to attain proper operating speed even when subjected to a heavy load condition, such load condition, however, being under the overload limit.

When the motor is subjected to comparatively light loads, it will often attain proper running speed in a very short time, in fact, before the thermal element has become sufficiently heated as to expand and permit opening of the starting circuit by the spring. Under these conditions the starting winding-circuit of the motor is maintained effective even while the motor is running at proper speed to perform its work. To permit the starting circuit to be closed and effective while the motor is running at proper working speed tends toward the production of undesirable noises in the motor such as "growling" or the like.

It is the object of the present invention to improve the patented device in such a way that said device will not only function in the manner disclosed in the patent and generally defined above, but will also be adapted to render the starting winding circuit of the electric motor completely ineffective as soon as the motor reaches its proper working speed which, under some circumstances, is before the time the thermal element of the device becomes effective to do the same thing.

This object is attained by providing a control device as described heretofore, with an electromagnetically controlled member adapted to be preconditioned by the said heavy surge of current flow during the motor starting cycle, said member being released to effect opening of the starting winding circuit when the said current flow drops off to normal, which occurs as soon as the motor is running properly to take care of its work. As has been said before, when the motor load is comparatively light, the motor will attain its proper running speed before the thermal element of the control device can become effective to open the starting circuit, thus this electromagnetically controlled member may become effective before the thermal element to open the starting circuit of the motor.

It will, of course, be understood that the electromagnetically controlled member would be ineffective to perform its function when the motor is subjected to heavier loads, under which circumstances running speed of the motor is generally not attained before the thermal element has become sufficiently heated to expand and permit the spring to effect starting circuit opening. If such running speed is not reached until the thermal element is predeterminately heated, current drop will not become effective to release the electromagnetically controlled member to perform its function of breaking the starting circuit until substantially the movement of circuit opening under control of the thermal element. In fact, under these circumstances, the electromagnetically controlled member would of itself be unable to open the starting circuit until some other element of the device, such as the thermal element, broke its circuit.

Therefore it will readily be seen that although both the electromagnetically controlled member and the thermal element separately act to actuate the device to open the motor starting circuit, the first will perform this function before the other under certain circumstances to prevent undue noises while the other will perform the function under circumstances in which the first would not act at all.

Further objects and advantages of the present invention will be apparent from the following description, reference being had to the accompanying drawing wherein a preferred embodiment of the present invention is clearly shown.

In the drawing:

All of the three figures are diagrammatic views showing the control device of the present invention connected with an electric motor.

Figure 1:
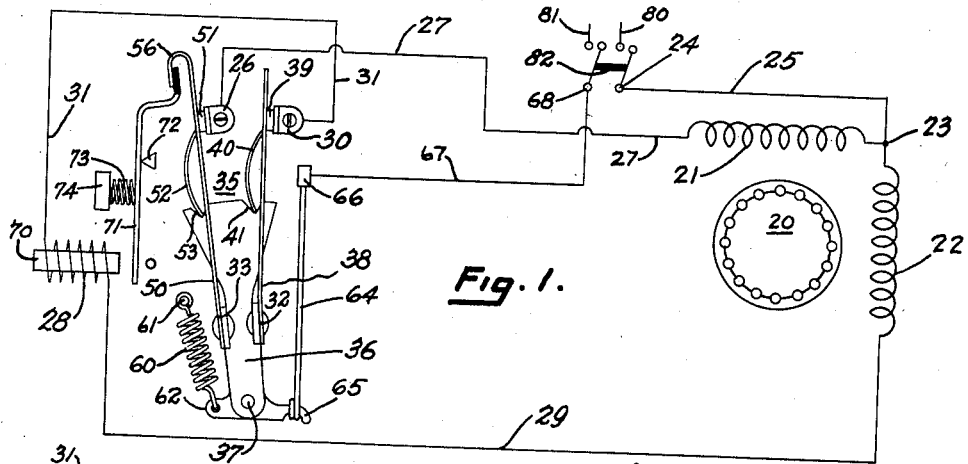
Fig. 1 shows the device in the normal off position.

Referring to the drawing the electric motor is designated as a whole by the numeral 20. The starting winding of the motor is designated by the numeral 21, the running winding by the numeral 22. Both windings 21 and 22 have one end connected to a common terminal 23 which in turn is connected with the switch terminal 24 thru a wire 25. The other end of the starting winding 21 is connected with the stationary contact 26 of the switch thru wire 27. The other end of the running winding 22 is connected with one end of the electromagnet winding 28 thru the wire 29. The opposite end of the electromagnet 28 is connected with the stationary contact 30 of the switch by a wire 31. The switch, designated as a whole by the numeral 35, comprises a body portion 36 pivoted at 37. A flexible contact blade 38 has its one end secured to the switch body 36 as at 32, a contact 39 being carried by said spring blade adjacent its free end so as to cooperate with the stationary contact 30. The flexible contact blade 38 has an integral tongue 40 the free end of which rests in a V-shaped notch 41 provided in a face of the switch body 36. This tongue is adapted when on one side of the blade 38 to urge the blade in one direction and when on the opposite side of the blade to urge the blade in the opposite direction. In the Fig. 1 the resting point of the tongue 40 in the notch of the body portion of the switch is to the left of the flexible blade 38 and consequently tongue 40 will urge the blade 38 to the right so as to cause engagement of contact 39 with the stationary contact 30.

Another flexible contact blade 50 has one end attached to the body 36 of the switch as at 33 and carries a contact 51 adjacent its free end so as to cooperate and engage with the stationary contact 26. A tongue 52, similar to tongue 40 of the blade 38, has its free end resting in the notch 53 of the switch body and in the position shown in Fig. 1 tongue 52 urges blade 50 so that its contact 51 engages the contact 26. To cause contact disengagement it is necessary merely to rotate the body 36 of the switch clockwise about the pivot point 37 from the position shown in Fig. 1, in which case the resting point of tongue 52 in its notch 53 will pass from the left to the right side of flexible contact blade 50 so that said tongue will urge the blade 50 to the left causing its contact 51 to be moved out of engagement with its stationary contact 26 following which, upon continued clockwise movement of the switch body 36 the resting point of tongue 40 in its notch 41 will pass from the left to the right side of the flexible blade 38 urging it toward the left to break engagement of its contact 39 with the cooperating stationary contacts 30. It will be noted in Fig. 1 that the resting point of tongue 52 in its notch 53 is closer to alignment with its flexible blade 50 than the resting point of blade 40 in its notch 41 to the flexible blade 38, thus clockwise rotation of the switch body 36 will result in successive movements of blades 50 and 38, the blade 50 first being shifted to open its contact engagement following which the blade 38 will be moved to disengage its contact 39 from contact 30.

The means for moving the switch body 36 about its pivot point 37 comprises counteracting elements one, a spring 60 with one end anchored to a stationary post 61 the other to an ear 62 formed on the switch body 36 adjacent its pivot point. The other element comprises a thermoelectric strut 64 having one end anchored to and electrically connected with an ear 65 provided on the switch body 36, the other end of said strut being secured to a stationary terminal block 66. The strut 64 is so adjusted that normally it holds the switch body 36 in the contact closing position as shown in Fig. 1 overcoming the effort of the spring 60 to move the switch body clockwise. However, the thermoelectric strut is of such a character that in response to a predetermined current flow therethru it will expand thus permitting the spring 60 to become effective to rotate the switch body 36 clockwise in accordance with the degree of expansion of the strut 64.

It has been stated that the present invention relates to an improvement over the switch disclosed in applicant's previously referred to Patent #2,095,579. This improvement includes the addition of an electromagnetically operated device comprising an electromagnet having a core 70 about which is provided the electromagnet winding 28. An armature 71 pivoted on the member 72 is adapted to be actuated clockwise as regards Fig. 1 by energization of the electromagnet. A spring 73 interposed between armature and an abutment block 74 urges the armature counterclockwise away from the electromagnet core 70 the end of the armature opposite the core having an insulated portion which engages a hooked portion 56 provided on the free end of the flexible contact blade 50 as shown in Fig. 1.

From the aforegoing it will be seen that the tongue 52 of the spring blade 50 urges said spring blade to the right to cause engagement of contact 51 with the stationary contact 26 while spring 73 exerts pressure upon the armature 71 engaging the hooked portion 56 of the flexible blade 50 tending to move it in the opposite direction to cause disengagement of the contact 51 with the contact 26. However, tongue 52 and spring 73 are so designed that the effort of tongue 52 to move the blade 50 into contact engaging position is slightly greater than the effort of the spring 73 upon the armature 71 tending to move said flexible blade into the contact disengaging position so that normally contact 51 will be held in engagement with its cooperating stationary contact 26, even against the counteracting effort of said spring 73.

The anchor block 66 to which one end of thermo electric strut 64 is secured is connected thru wire 67 with switch terminal 68. Switch terminals 24 and 68 may be connected with the power lines 80 and 81 respectively by closing switch 82.

Figure 2:
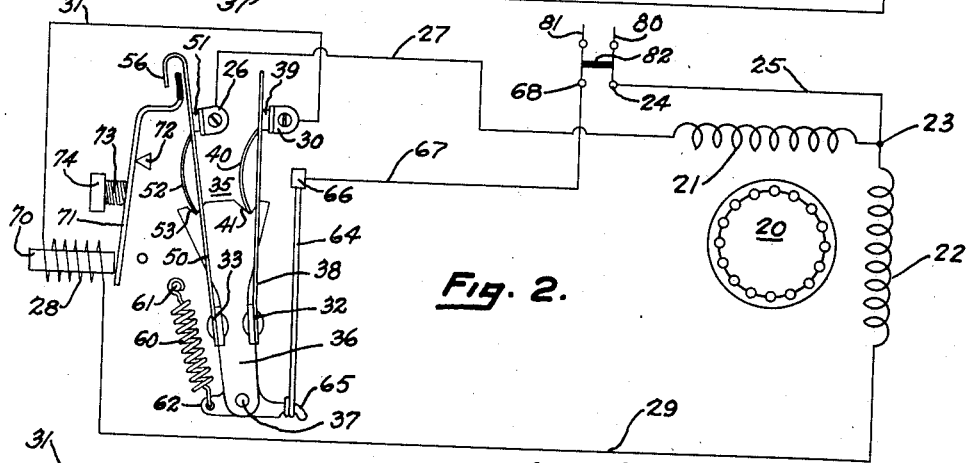
Fig. 2 shows the device in the cocked position immediately after the motor circuits have been connected with the source of electrical energy and, Fig. 3 shows the device after the motor has reached proper operating speed at which time the device has opened the stationary circuit of the motor.

When the switch 82 is first closed as shown in Fig. 2 for purpose of operating the motor, an initial heavy surge of current will traverse the following circuits. From the power line 81 across switch 82 to the terminal 68, thence thru the wire 67 to the abutment block 66, thru the thermoelectric strut 64 to the body 36 of the switch, from here two circuits are established, one flowing thru the flexible contact blade 38 attached to the switch body 36, thru contacts 39 and 30, thru wire 31, electromagnet winding 28, wire 29, running winding 22 of the motor 20 to wire 25, thence thru wire 25 terminal 24 of terminal 23, thence thru wire 25 terminal 24 of switch 82 to the other side 80 of the power line. The second circuit from the thermoelectric strut 64 and body 36 will flow thru the flexible contact blade 50 across contacts 51 and 26 thru wire 27 starting winding 21 of motor 20 to the common terminal 23, thence to the other side 80 of the power line through wire 25 and switch 82. This initial heavy surge of current flow will start the motor to operate and will, at the same time energize the electromagnet winding 28 and its core 70 to attract the armature 71, moving it clockwise about its pivotal point 72 and thereby moving its insulated end out of engagement and in spaced relation with the hooked end 56 of the flexible contact blade 50. This is clearly shown in the Fig. 2. This current flowing thru the thermoelectric strut 64 will cause it to be heated resulting in an expansion thereof.

In the preamble to this specification it has been stated that the thermo element or strut 64 is so designed that a predetermined heavy surge of current must traverse it a predetermined time before it will heat up and expand sufficiently to permit spring 60 to effect opening of the motor starting circuit. That this predetermined time is of sufficient duration to permit the motor to attain proper operating speed even when subjected to a heavy load condition, such load condition however, being under the overload limit.

It has also been previously stated that when a motor is subjected to a comparatively light load it will often attain proper running speed in a very short time, in fact, before the thermoelectric element 64 has been sufficiently heated as to expand and permit opening of the starting circuit by the spring. That under such conditions maintenance of the starting circuit while the motor is running at the proper speed to perform its work results in the production of undesirable noises such as growling by the motor or the like.

Thus, in the present invention and thru the provisions of the electromagnetically operated device the starting circuit may be opened when and as soon as the motor begins to operate at proper speed. When this occurs, that is, as soon as the motor attains proper operating speed the initial heavy surge of starting current will drop or be decreased such decrease in the flow of current partially de-energizing the electromagnet comprising winding 28 and core 70.

Figure 3:
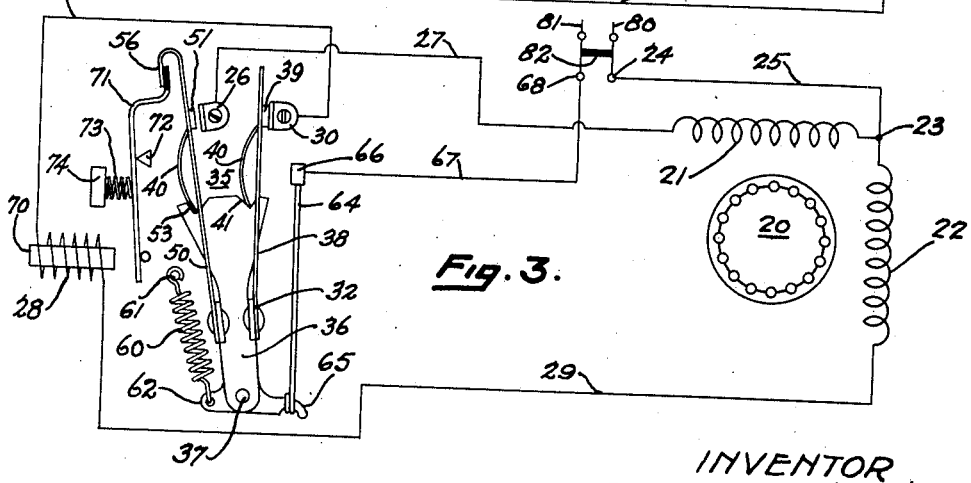

Upon partial de-energization of said electromagnet spring 73 acting upon the arm 71 will now be of sufficient strength to move the armature 71 quickly from the position shown in the Fig. 2 to the attracted position shown in the Fig. 3 toward its normal position shown in Fig. 1, such quick shifting of the armature exerting a hammer blow effect upon the hooked end 56 of the flexible contact blade 50 and overcomming the effort of tongue 52 to hold said blade 50 in its contact engaging position. When the released armature has effected movement of the blade 50 as shown in Fig. 3 due to the drop in the current flow thru the electromagnet and the resultant partial de-energization thereof, contact 51 is separated from its cooperating stationary contact 26 and thus the circuit including the starting winding 21 is completely interrupted thereby rendering said starting winding 21 entirely ineffective. Now only the running winding completed across closed contacts 39 and 30 is being energized for normal motor operation.

If for some reason such as a heavy load on the motor prevents or more specifically postpones the aforedescribed drop in the current flow thru the motor circuits then the electromagnet will not be partially de-energized but will be sufficiently energized to maintain the armature 71 in attracted position as shown in Fig. 2. As a consequence the starting winding circuit across contacts 51 and 56 will be maintained as long as such a drop in current does not occur, and under some motor load conditions the electromagnetic device might not function at all, the opening of the starting winding circuit being effected only after the current has traversed the thermoelectric strut 64 sufficiently to expand said strut to permit spring 60 to become effective and operate the switch body 36 to open contacts 51 and 26. Thus it may be seen that not only are two separate means provided for opening the starting winding circuit of the motor under different conditions but also there is provided one device acting as a safety means adapted to function in case the other control means be rendered ineffective, for one reason or another.

From the aforegoing description it may readily be seen that in the present invention applicant has provided a control device for an electric motor which not only protects the motor against damage under abnormal running conditions, but it also provides a dual means for controlling the starting circuit of said motor. Said starting circuit is rendered ineffective by one portion of the device as soon as the motor becomes operative thereby avoiding undesirable noises in the motor and is also interrupted and rendered completely ineffective by another portion of the device in response to an excessive current flow thru the device or a current flow of predetermined value and duration.

While the form of embodiment of the present invention as herein disclosed constitutes a preferred form, it is to be understood that other forms might be adopted, all coming within the scope of the claims which follow.

What is claimed is as follows:

1. A control device for an electric motor having starting and running winding circuits adapted to be connected to a source of electric power; a switch having a separate pair of normally closed contacts electrically connected in each motor circuit; thermo-electric means secured to the switch and electrically connected in both motor circuits said thermo-electric means being adapted to be energized and rendered active to effect separation of the contacts in the starting winding circuit in response to either an excessive current flow or a normal current flow of predetermined duration therethrough; and electromagnetic means comprising a winding electrically connected in series with the running winding circuit and an armature mechanically engaging one of the contacts in the starting winding circuit, said electromagnetic means being rendered effective by a predetermined drop in the flow of current therethrough to separate said contacts in the starting winding circuit.

2. A control device for an electric motor having starting and running winding circuits adapted to be connected to a source of electric power; a switch having a separate pair of normally closed contacts electrically connected in each motor circuit; thermo-electric means secured to the switch and electrically connected in both motor circuits, said thermo-electric means being adapted to be energized and rendered active by either an excessive current flow or a current flow of predetermined duration therethrough for effecting operation of the switch to open the starting winding circuit of the motor regardless of motor operation; and electromagnetic means supported by the switch and connected in series with the running winding circuit, said electromagnetic means being rendered effective, when its energization is reduced by a predetermined drop in current flow therethrough resulting from the motor attaining operating speed, for engaging and opening the pair of contacts in the starting winding circuit.

3. A control device for an electric motor having a starting and a running winding adapted to be connected to a source of electric power; a switch provided with a set of normally closed contacts connected in circuit with each motor winding; resilient means yieldably urging the switch to open its contacts; a thermal member mechanically secured to the switch and connected in series circuit with both motor windings respectively, said thermal member being normally tensioned to hold the switch in contact closing position against the opposing effect of the resilient means and being adapted to be heated by either an excessive current flow or a current flow of predetermined duration therethrough and expand, whereby the resilient means is rendered effective to move the switch and open its contacts; and an electromagnetic device connected in series with the running winding, and energized by the closing of its circuit to be moved into operative position said device being adapted to strike and open the contacts in the starting winding circuit when it is released in response to reduced energization due to a predetermined drop in current flow through said device resulting from the motor attaining operating speed.

4. A control device for an electric motor having starting and running windings adapted to be connected to a source of electric power; a switch providing a separate set of normally closed contacts in series with each motor winding and a thermo-electric member connected in series with each motor winding and attached to the switch so as to effect its operation to open the sets of contacts in response to either an excessive current flow or a current flow of predetermined duration therethrough; and an electromagnetic device connected in circuit with the running winding, and adapted to be preconditioned by the initial surge of current through its circuit, as the motor windings are energized for motor starting purposes, for engaging and opening the contacts in circuit with the starting winding in response to a predetermined drop in current flow resulting from the motor attaining proper operating speed.

5. A control device for an electric motor having starting and running windings adapted to be connected to a source of electric power; a switch having a separate set of normally closed contacts connected in series with each motor winding; a spring attached to the switch and yieldably urging the switch to open its contacts; thermo-electric means secured to the switch and electrically connected to both motor windings, said means being normally tensioned to hold the switch in contact closing position against the effect of the spring and being adapted to be heated and consequently expanded in response to either an excessive or a normal current flow of predetermined duration therethrough for effecting operation of the switch by the spring to open the contacts; and an electromagnetic device comprising a magnet winding connected in series with the running winding and an armature normally engaging one of the contacts in series with the starting winding, said device being energized by the closing of the running winding circuit to move the armature out of its contact engagement, said armature being quickly returned to its normal position and in so doing separating the contacts in series with the starting winding in response to a predetermined drop in current flow therethrough resulting from the motor attaining proper operating speed.

6. A control device for an electric motor having starting and running windings adapted to be connected to a source of electric power; a switch providing a separate set of normally closed contacts connected in circuit with each motor winding; and a plurality of switch control means, one a thermo-electric member attached to the switch and connected in series with both motor windings and adapted to effect operation of the switch successively to open the contacts in circuit with the starting and the running windings, respectively, in response to predetermined current flow through said member, the other switch control means comprising an electromagnetic device, connected in series with the running winding of the motor and normally engaging a contact in circuit with the starting winding; said device being preconditioned by the completion of its circuit for opening the contacts in circuit with the starting winding when the current flow through the electromagnetic device and running winding drops to a predetermined value.

CALVIN J. WERNER.